(No Model.)
B. WOOD.
FISH TRAP.
No. 528,839.
Patented Nov. 6, 1894.
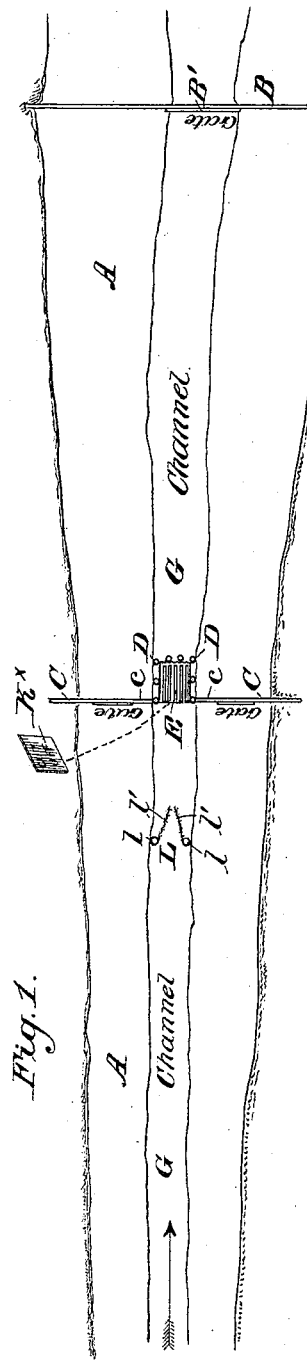
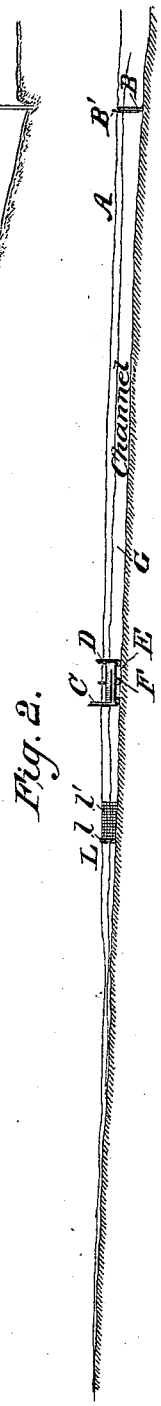
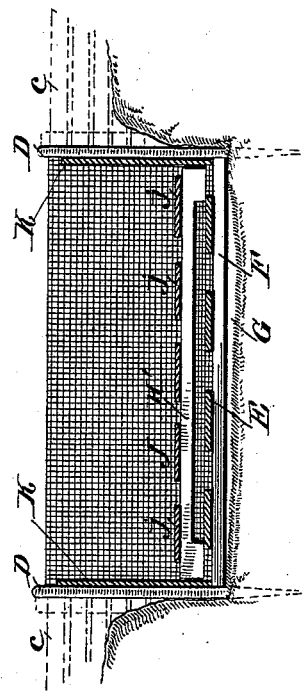
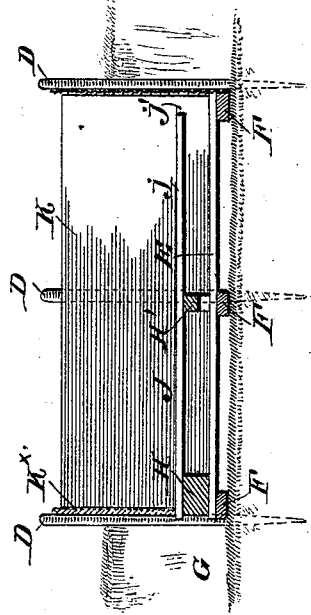
WITNESSES:
Fred G. Dieterich
Jos. A. Ryan
INVENTOR
Bernice Wood.
BY
Munn & Co
ATTORNEYS.

UNITED STATES PATENT OFFICE.

BERNICE WOOD, OF BENSON, NORTH CAROLINA.

FISH-TRAP.

SPECIFICATION forming part of Letters Patent No. 528,839, dated November 6, 1894.

Application filed May 8, 1894. Serial No. 510,482. (No model.)

*To all whom it may concern:*

Be it known that I, BERNICE WOOD, residing at Benson, in the county of Johnston and State of North Carolina, have invented certain new and useful Improvements in Fish-Traps, of which the following is a specification.

My invention has for its object to provide a simple and inexpensive fish trapping means, which will effectively serve for its intended purposes, and which can be set up by unskilled labor.

It has also for its object to provide a trap of this character, which can be so arranged and set to catch a large or small quantity of the fish in the pond at each operation, and which is also so arranged that while it will collect the larger fish, it will allow the small ones to pass therethrough.

The invention consists in such peculiar combination and novel arrangement of parts as will be first described in detail and then be specifically pointed out in the appended claims, reference being had to the accompanying drawings. in which—

Figure 1 is a diagrammatic plan view of my improved fish trapping means. Fig. 2 is a longitudinal section of a fish pond having my improved trapping devices therein. Fig. 3 is a longitudinal section of the trap or collecting box proper. Fig. 4 is a transverse section of the same.

Before describing my invention in detail, I desire to state, that in addition to the objects of my invention before mentioned, such invention has for its purpose, to provide means whereby a considerable amount of swamp or waste land can be made valuable and utilized for fish culture at great profit, and in its use it is more especially adapted for such swamp lands, in which small running streams or gulleys are found,.which can be easily turned into ponds by damming, and in which fish can be propagated.

Referring now to the drawings, A indicates a pond, of say one mile in length, which is dammed at B, at which point, for example it is eight feet in depth, which gradually decreases to the beginning point where the depth is practically nothing. The dam B has a gate B' for draining off the water when desired. About midway of the pond, is a transversely disposed slatted fence C which extends from bank to bank, the slats $c$ being spaced sufficiently apart to allow for the passage of smaller fish. At the center or channel portion of the pond the fence has a pocket or trap portion proper, which in the actual construction is about sixteen feet square, and comprises a series of posts D D arranged to form the sides and the end of the said trap or pocket, the front of such pocket being left open for a purpose presently explained. While I prefer to set the fence and trap midway of the pond, it is manifest that by setting such fence and trap nearer the upper end of such pond a smaller amount of fish will be trapped, while setting it lower down the pond, a larger number will be caught. In all cases however the bottom of the trap is at a point slightly below the side walls of the pond furrow or channel portion G. The bottom of the pocket comprises a longitudinally slatted floor E, secured on transverse sill members F. On this floor E are secured transverse sills H H' on which is secured a second slatted floor section J, the slats $j$ of which stop short of the end of the pocket, as at $j'$ to form an opening sufficiently large to allow large fish to pass down between the upper and lower slatted floor member, from which it will be difficult for them to get out; the smaller fish passing down between the slats. To allow for a ready passage of the water the rear wall of the pocket is formed of wire netting, the sides being in the nature of removable gate members K as shown.

$K^\times$ indicates a removable gate or board, which is used to close off the front of the trap after the fish are caught, to turn the water around the trap.

A short distance in front of the trap proper, in the channel G is disposed a fish-way or guide L formed of the posts $ll$ and the netting sides $l'\ l'$ which converge to the front and form a deflector or cut off for a return movement of the fish.

The manner in which my improved trap devices operate is best explained as follows: After the trap has been properly adjusted, the gate in the dam B is opened to allow the pond to drain off, fast or slow as may be desired. As the water lowers in the upper end of the pond, the fish will crowd into the channel and follow the course of the water. After the water has been so drawn off as to leave only a stream in the channel-way the fish after passing through the front gate or guides K will be caught in the trap or pocket, at which point the smaller ones will pass down through the slatted floor, while the larger ones will remain therein and become piled up as the water recedes, from which they can be readily removed. The gate in the dam is then closed and gates (provided in the slatted fence) are opened which allows for a free passage of the water and allows the pond to fill up and the fish remaining to freely circulate therein.

Having thus described my invention, what I claim, and desire to secure by Letters Patent, is—

1. An improved means for catching fish, which comprises a pond having a water course in one direction, a dam having a gate, a slatted fence disposed transversely across the pond at a point in advance of the dam, having a central opening, a trap or pocket secured to the rear of the central opening having a slatted floor and closed sides and rear end all arranged substantially as shown and described.

2. An improved means for catching fish comprising a pond having an inclined bottom, a central or channel gulley, a dam at the lower end of the pond having a drain gate, a trap formed of a pocket or box having closed sides and rear end and having a slatted floor, held in the said gulley, and transverse fence or guard portions extended from the trap beyond the sides of the said gulley all arranged substantially as shown and described.

3. In a fish trapping means, a trap or pocket comprising supporting posts, cross sills connected thereto, a slatted floor connected to sills extended longitudinally between the posts, transverse sills secured on the said slatted floor, a second slatted floor secured to such sills and extended rearward but stopped short of the end of the lower slatted floor, closed side members projected up from the floor and a net portion forming the rear end of such trap or socket all arranged substantially as shown and described.

BERNICE WOOD.

Witnesses:
 JONAS REAVES,
 GEORGE W. CAVENAUGH.